United States Patent
Rice et al.

(10) Patent No.: US 6,681,335 B1
(45) Date of Patent: Jan. 20, 2004

(54) SYSTEM FOR CONTROLLING POWER PLANE OF A PRINTED CIRCUIT BOARD BY USING A SINGLE VOLTAGE REGULATOR TO CONTROL SWITCHES DURING FIRST AND SECOND POWER MODES

(75) Inventors: Ritchie E. Rice, Beaverton, OR (US); Anthony E. Morello, Portland, OR (US)

(73) Assignee: Intel Corporation, Santa Clara, CA (US)

(*) Notice: Subject to any disclaimer, the term of this patent is extended or adjusted under 35 U.S.C. 154(b) by 619 days.

(21) Appl. No.: 09/604,683

(22) Filed: Jun. 26, 2000

(51) Int. Cl.[7] ................................................. G06F 1/26
(52) U.S. Cl. ..................... 713/320; 713/340; 307/112
(58) Field of Search ................................ 713/300, 320, 713/321, 323, 324, 340; 331/44, 108 R; 327/538; 307/29, 43, 113, 151

(56) References Cited

U.S. PATENT DOCUMENTS

| | | | | |
|---|---|---|---|---|
| 5,337,205 A | * | 8/1994 | Haun et al. | 361/56 |
| 5,515,539 A | * | 5/1996 | Ohashi et al. | 713/324 |
| 5,712,589 A | * | 1/1998 | Afek et al. | 327/538 |
| 5,736,796 A | * | 4/1998 | Price et al. | 307/151 |
| 5,864,225 A | * | 1/1999 | Bryson | 323/268 |
| 6,137,188 A | * | 10/2000 | Mitchell et al. | 307/29 |

FOREIGN PATENT DOCUMENTS

JP        02219425 A   *  9/1990    ............. H02J/7/16

OTHER PUBLICATIONS

IBM Technical Disclosure Bulletin—"Voltage Regulating Circuit" —Oct. 1970—vol. 13, Issue 5, p. 1169–1170.*

Richard McDonald—"Voltage Regulation with Semiconductors" —Jun. 6, 1995—Newsgroups: sci.electronics.*

* cited by examiner

Primary Examiner—Thomas Lee
Assistant Examiner—Thuan Du

(57) ABSTRACT

An apparatus and method for power plane control/management for a printed circuit board is provided. A single voltage regulator has an input terminal to receive a main voltage supply and has a drive terminal. First and second transistors, such as field effect transistors (FETs), have first terminals coupled to the drive terminal of the voltage regulator and second terminals coupleable to a first power plane. The first transistor has a third terminal coupleable to an auxiliary voltage supply, and the second transistor has a third terminal coupleable to a second power plane. During a first power mode, such as a full power mode, the drive terminal of the voltage regulator is coupled to turn off the first transistor and to turn on the second transistor, thereby providing regulated voltage from the main voltage supply to the first power plane and to the second power plane through the turned-on second transistor. During a second power mode, such as a low power mode, the drive terminal of the voltage regulator is coupled to turn off the second transistor and to turn on the first transistor to provide auxiliary power to the first power plane from the auxiliary power supply through the turned-on first transistor.

26 Claims, 1 Drawing Sheet

SYSTEM FOR CONTROLLING POWER PLANE OF A PRINTED CIRCUIT BOARD BY USING A SINGLE VOLTAGE REGULATOR TO CONTROL SWITCHES DURING FIRST AND SECOND POWER MODES

BACKGROUND OF THE INVENTION

1. Field of the Invention

The present invention relates generally to power management, and in particular, relates to power plane control for a printed circuit board (PCB), such as a peripheral component interconnect (PCI) card useable for computer network applications.

2. Background Information

The personal computer (PC) has become very popular in recent years as a tool for accessing the Internet. Desktop PCs and laptop PCs are examples of terminals that can be used to communicate with the Internet, where in some applications, one or more PCs in homes can share an existing telephone line when connecting to the Internet.

These PCs typically use PCI components, such as controllers and transceivers in the form of chips mounted on or coupled to one or more PCBs (sometimes referred to as a "card"), in order to perform various networking and peripheral device operations. Multi-layer PCBs have different portions of the needed interconnections on each layer. Some of these layers are dedicated to power supply distribution and some to ground (power supply return). The term "plane" is often used in reference to the various layers of a multi-layer PCB, such as those layers dedicated for power supply and ground.

Various standards specify the level of power that needs be provided to the power planes under different operating conditions. An example of these standards/specifications includes the Advanced Configuration and Power Interface (ACPI), revision 1.0b, published Feb. 8, 1999. The operating conditions that require different power levels include a full power mode, where full operating power is required, and a low power mode, where it is desirable to minimize power consumption.

To meet specification requirements for full power and low power modes, PCI board designers generally use a voltage regulator to control power to one power plane and a separate voltage regulator to control power to another power plane, if separate power planes are present. However, the use of multiple voltage regulators results in an increase in the number of total components per card. Such an increase in components disadvantageously uses up precious space on a card and results in increased costs.

BRIEF DESCRIPTION OF THE DRAWINGS

A non-limiting and non-exhaustive embodiment of the present invention will be described in the following figure, wherein like reference numerals or labels refer to like parts unless otherwise specified.

DETAILED DESCRIPTION OF THE ILLUSTRATED EMBODIMENTS

Figure 1:
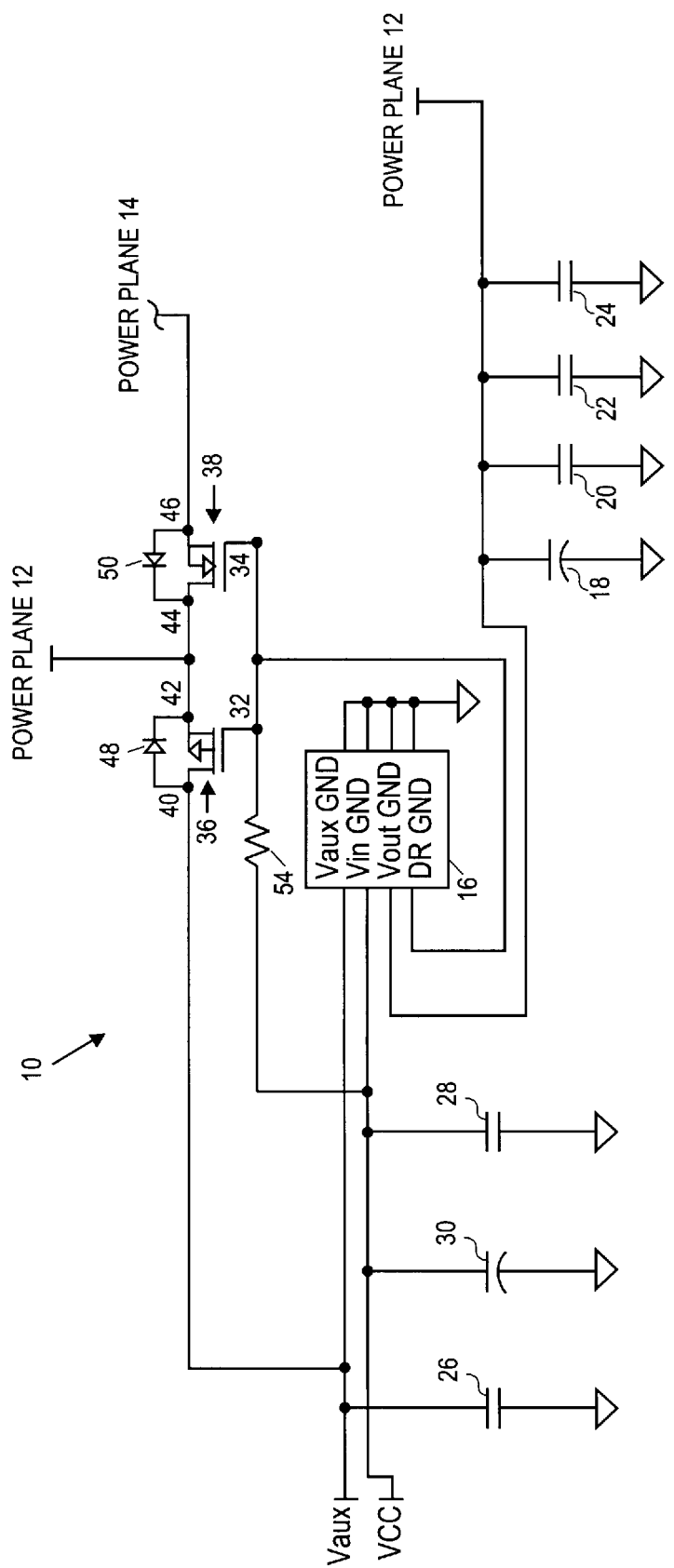
FIG. 1 is a schematic diagram of a circuit according to an embodiment of the invention.

Embodiments of an apparatus and method for power plane control are described in detail herein. In the following description, some specific details are provided, such as the description of various capacitors in FIG. 1, to provide a thorough understanding of embodiments of the invention. One skilled in the relevant art will recognize, however, that the invention can be practiced without one or more of the specific details, or with other methods, materials, components, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Referring to the schematic of FIG. 1, shown generally at 10 is a circuit according to an embodiment of the invention. The circuit 10 can be among the components mounted on a PCB, for example. In another embodiment, the circuit 10 may comprise part of circuitry on an integrated circuit chip.

The circuit 10 manages/controls the supply of power to two different power planes 12 and 14. The power planes 12 and 14 can be power planes for a PCI card useable for computer network applications in one embodiment. The power plane 12, in this embodiment, is referred to as "VDDCORE" and supplies power to portions of transceiver and controller components of a PCI card. The power plane 14, in this embodiment, is referred to as "VDDBUS" and supplies power to interfaces to a PCI bus. It is noted that a PCI implementation is described herein for the sake of example and simplicity of illustration. It is understood that embodiments of the invention can be applied to implementations other than PCI implementations, and therefore, the invention is not limited by the particular implementation.

In a full power mode, power from a main power supply VCC is provided to both power planes 12 and 14. In a low power mode, the power from the main power supply VCC is shut off, reduces, or isolated, so that power from an auxiliary power supply Vaux is provided to the power plane 12. In the low power mode, little or no power is provided to the power plane 14.

According to an embodiment of the invention, the main power supply VCC is 5 volts and the auxiliary power supply Vaux is 3.3 volts. It is to be appreciated, however, that the power supplies VCC and Vaux can take on any value(s) that are suitable for a particular application of the circuit 10, and therefore, the invention is not limited by the specific value(s) used. For simplicity of explanation and for illustrative purposes, these specific values for VCC and Vaux will be used throughout this description.

In an embodiment of the invention, the circuit 10 includes a voltage regulator 16. The voltage regulator 16 regulates the main power supply VCC and/or the auxiliary power supply Vaux, such that 3.3 volts, for example, are provided to the power planes 12 and 14, in a manner that will be described later below. An example of a suitable voltage regulator 16 that can be used by an embodiment of the invention is a Semtech 400 mA SmartLDO regulator.

The voltage regulator 16 has an input terminal Vin coupled to the main power supply VCC. In some types/models of voltage regulators, the voltage regulator 16 can have another input terminal coupled to the auxiliary power supply Vaux, but in other types/models of voltage regulators, an input terminal connected to the auxiliary power supply Vaux is not required (e.g., there can be a no connection "NC" at that input terminal). The voltage regulator 16 further includes an output terminal Vout and a drive terminal DR. In one embodiment, the drive terminal DR and the output terminal Vout, can be separate terminals, while in another embodiment of the voltage regulator 16, the drive terminal DR and the output terminal Vout can be the same terminal. The voltage regulator 16 can include one or more ground terminals GND.

In the embodiment of the circuit 10 shown in FIG. 1, the output terminal Vout of the voltage regulator 16 is coupled to the power plane 12. One or more capacitors 18–24 can be coupled between the output terminal Vout and ground. The capacitor 18 can be a bulk capacitor having a value of 4.7 microFarads, for example, to build up power, and the capacitors 20–24 can have a value of 0.1 microFarads, for example, to perform filtering. Similarly, a capacitor 26 having a value of 0.1 microFarads, for example, can be coupled between the auxiliary power supply Vaux and ground, and a capacitor 28 having a value of 0.1 microFarads, for example, can be coupled between the main power supply VCC and ground, to provide filtering. A bulk capacitor 30 having a value of 4.7 microFarads, for example, can be coupled between the main power supply VCC and ground, in order to store/build up power.

It is to be appreciated that the capacitors 18–24 and 26–30 and their specific connection(s) in the circuit 10 are described herein for illustrative purposes only, and so are not required to be connected exactly as shown in FIG. 1. Some embodiments of the invention may use other configurations/connections of capacitors, while other embodiments may not even utilize capacitors. Therefore, the invention is not limited by the presence, specific values, or connections of the capacitors 18–24 and 26–30.

The drive terminal DR of the voltage regulator 16 is coupled to gate terminals 32 and 34 of transistors 36 and 38, respectively, which act as switching devices. In one embodiment, the transistor 36 is a P-channel field effect transistor (FET), while the transistor 38 is an N-channel FET. P-channel junction field effect transistors (JFETs) or P-channel metal oxide silicon FETs (MOSFETs) can be used for the transistor 36. Similarly, N-channel JFETs or N-channel MOSFETs can be used for the transistor 38. Other types of FET devices may be used as well, including metal-insulator semiconductor FETs (MISFETs) and insulated gate FETs (IGFETs).

FETs are provided in an embodiment because they have advantageous features of requiring low drive at their gate terminals and/or having a small voltage drop/differential across their drain and source terminals when they turn on (e.g., the resistance $r_{DS(ON)}$ is low). It is to be appreciated, however, that other types of devices that have these features may be used. Therefore, the invention is not limited by the specific type of transistor and/or switching device(s) used.

A drain terminal 40 of the transistor 36 is coupled to the auxiliary power supply Vaux, and a source terminal 42 is coupled to the power plane 12. A drain terminal 44 of the transistor 38 is coupled to the power plane 12, and a source terminal 46 is coupled to the power plane 14.

Diodes 48 and 50 may be optionally coupled, respectively, across the drain terminal 40 and the source terminal 42, and across the drain terminal 44 and the source terminal 46. The diodes 48 and 50 function as current direction controllers, but need not be included in some embodiments of the invention.

A low-resistance resistor 54 is coupled between the main power supply VCC and the gate terminals 32 and 34. The resistor 54 can have a value between 0 and 10 ohms, for example, and its illustrative connection shown in FIG. 1 provides an additional connection between the gate terminal 34 of the transistor 38 and the main power supply VCC.

Operation of the circuit 10 will now be described for the full power mode and for the low power mode. Beginning first with the full power mode, the power planes 12 and 14 are both required to be supplied with full operating voltage, which is 3.3 volts for discussion purposes herein. The main power supply VCC provides 5 volts to the input terminal Vin of the voltage regulator 16. The voltage regulator 16 changes this 5-volt input voltage to 3.3 volts and outputs this voltage at the output terminal Vout. The output terminal Vout is coupled to the power plane 12, thereby providing 3.3 volts to the power plane 12.

Meanwhile, the drive terminal DR of the voltage regulator 16 outputs 3.3 volts (or some other positive voltage in the range of 3.3 volts to 4.5 volts, for example) to the gate terminals 32 and 34 of the transistors 36 and 38, respectively. Because the transistor 36 is a P-channel FET, it is turned off (e.g., becomes an open circuit or open switch). The transistor 38, however, because it is an N-channel FET, is driven by the positive voltage at its gate terminal 34 and turns on (e.g., becomes a short circuit or closed switch). As a result, 3.3 volts is also supplied to the power plane 14. In effect, the turned-on transistor 38 connects the power planes 12 and 14 together, and both power planes 12 and 14 receive power from the regulated main power supply VCC during full power mode.

In some instances, because the drive terminal DR of the voltage regulator 16 is trying to drive two transistors, insufficient power or voltage (e.g., less than 3.0 volts) may be provided to the power plane 14. Therefore, the additional connection between the gate terminal 34 and the main power supply VCC (through the resistor 54) provides sufficient drive voltage to turn the transistor 38 completely on.

In low power mode, the main power supply VCC is typically turned off, reduced, or isolated. Therefore, no power is provided to the power plane 14, and the auxiliary power supply Vaux provides power to the power plane 12 as follows. First, a zero voltage at the input terminal Vin of the voltage regulator 16 (indicative of the turned-off main power supply VCC) results in a zero-volt output at the output terminal Vout and at the drive terminal DR. The zero volts at the drive terminal DR turns off (e.g., makes into an open circuit) the transistor 38, thereby isolating or cutting off the power plane 14 from a supply of power. Because the main power supply VCC is dropped in low power mode, there is also no current or voltage provided to the gate terminal 34 of the transistor 38 via the connection through the resistor 54.

Because the transistor 36 is a P-channel FET, the zero voltage at its gate terminal 32 (provided from the drive terminal DR of the voltage regulator 16) causes the transistor 36 to turn on (e.g., to become a short circuit). This provides an electrical connection between the auxiliary power supply Vaux and the power plane 12, thereby providing the power plane 12 with 3.0 to 3.3 volts.

Embodiments of the invention thus provide an apparatus and method for controlling/managing power supplied to power planes of a PCI card/components. This is done in one embodiment through the use of the single voltage regulator 16, plus a few other elements. Examples of load current supplied to the power planes 12 and 14 during full power mode is 365 mA, while 200 mA can be supplied to the power plane 12 during low power mode. These values are well within tolerance levels for commercially available voltage regulators 16, and also meet existing specifications. Furthermore, embodiments of the invention provide a robust but simple solution that can accommodate power management requirements for 1 Mbps and 10 Mbps Ethernet functionality, and for power management requirements for other implementations. The reduction in components used, as compared to existing dual-voltage regulator implementations, provides savings in terms of both costs and space.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, while embodiments of the invention have been described herein as outputting a voltage at the drive terminal DR of the voltage regulator 16 that is positive when the main power supply VCC provided to the input terminal Vin is a positive voltage, it is possible to provide an embodiment where the voltage at the drive terminal is zero or negative when the voltage to the input terminal Vin is positive. In such a modification then, the transistor 38 can be a P-channel FET, and transistor 36 can be an N-channel FET. In other modifications, appropriate inverter(s) can be connected to the gate terminal(s) of the transistor 36 or the transistor 38 so that these two transistors can be both N-channel FETs or both P-channel FETs.

In another embodiment, the auxiliary power supply Vaux can be coupled to an input of the voltage regulator 16 (instead of being a no connection), such that at low power modes, positive voltage can be output from the output terminal Vout that is indicative of the positive input voltage from the auxiliary power supply Vaux, while zero or negative voltage can be output from the drive terminal DR to turn off the transistor 38 and to turn on the transistor 36. In yet another modification of this embodiment, the drive terminal DR can output a positive voltage at low power modes and still provide the appropriate turn-on/turn-off sequence for the transistors 36 and 38 if the appropriate conductivity type (e.g., N-channel or P-channel) transistors are used/connected, or if inverters are connected to their gates.

In other modifications, the main power supply VCC and the auxiliary power supply Vaux can come from a same source, instead of from two different sources. That is, the auxiliary power supply Vaux can simply be a reduced level of the main power supply VCC.

Furthermore, although a PCI implementation has been described herein for illustrative purposes, it is to be appreciated that some embodiments of the invention may be implemented with other systems/devices/cards, and therefore, the invention is not limited to PCI applications. For instance, an embodiment of the invention can be implemented for a Universal Serial Bus (USB) system. An embodiment of the invention also can be implemented for any type of system (not shown) where there may be a need to control/provide a limited current/power supply to a bus or power plane during a low power mode, and a current/power supply to a bus or power plane(s) during a full power mode. An example of such a system can have a Vsupply1 to provide a limited current supply that is always present, and a Vsupply2 that is present when the system is in a normal operating mode. A Vmain (such as a power plane or bus) is supplied only in the normal operating mode by Vsupply2 (or by both Vsupply1 and Vsupply2), such that full current is available to power all planes/busses. A Vcore (such as a power plane or bus) is maintained with its power supply (provided by Vsupply1) during a low power or sleep mode, such that limited current is provided to power only required planes/busses.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a single voltage regulator including an input terminal to receive a main voltage supply and a drive terminal; and
   first and second switching devices coupled to the drive terminal of the voltage regulator, wherein during a first power mode, the drive terminal of the voltage regulator is coupled to open the first switching device and to close the second switching device to provide regulated voltage from the main voltage supply to a first power plane and to a second power plane from the first power plane through the closed second switching device, wherein during a second power mode, the drive terminal of the voltage regulator is coupled to open the second switching device and to close the first switching device to provide auxiliary power to the first power plane.

2. The apparatus of claim 1 wherein the first power mode comprises a full power mode and wherein the second power mode comprises a low power mode.

3. The apparatus of claim 1 wherein the first and second switching devices comprise transistors.

4. The apparatus of claim 3 wherein the voltage regulator and the first and second switching devices are formed on an integrated circuit.

5. The apparatus of claim 3, further comprising diodes coupled between source and drain terminals of the first and second switching devices.

6. The apparatus of claim 1 wherein the first switching device comprises a P-channel field effect transistor and the second switching device comprises an N-channel field effect transistor.

7. The apparatus of claim 1 wherein the voltage regulator further includes an output terminal to supply the regulated voltage to the first power plane during the first power mode.

8. The apparatus of claim 1 wherein the first and second switching devices comprise transistors having gate terminals coupled to the drive terminal of the voltage regulator, the apparatus further comprising a low-resistance resistor coupled between the input terminal of the voltage regulator and the gate terminal of the second switching device.

9. The apparatus of claim 1, further comprising a plurality of capacitors coupled between the input terminal of the voltage regulator and ground, and between an output terminal of the voltage regulator and ground, to provide filtering.

10. The apparatus of claim 1 wherein the voltage regulator and the first and second switching devices are mounted on a circuit board.

11. An apparatus, comprising:
    a single voltage regulator including an input terminal to receive a main voltage supply and a drive terminal; and first and second transistors having first terminals coupled to the drive terminal of the voltage regulator and second terminals coupleable to a first power plane, the first transistor having a third terminal coupleable to an auxiliary voltage supply, the second transistor having a third terminal coupleable to a second power plane, wherein during a first power mode, the drive terminal of the voltage regulator is coupled to turn off the first transistor and to turn on the second transistor to provide regulated voltage from the main voltage supply to the first power plane and to the second power plane from the first power plane through the turned-on second transistor, wherein during a second power mode, the drive terminal of the voltage regulator is coupled to turn off the second transistor and to turn on the first transistor to provide auxiliary power to the first power plane from the auxiliary voltage supply through the turned-on first transistor.

12. The apparatus of claim 11 wherein the first and second transistors comprise transistors having different conductivity types.

13. The apparatus of claim 11, further comprising a low-resistance resistor coupled between the input terminal of the voltage regulator and the first terminal of the second transistor.

14. The apparatus of claim 11 wherein the first and second transistors comprise field effect transistors.

15. The apparatus of claim 11 wherein the voltage regulator and the first and second transistors are formed on an integrated circuit.

16. A system, comprising:

a main voltage supply;

a single voltage regulator including an input terminal coupled to the main voltage supply and a drive terminal; and first and second switching devices coupled to the drive terminal of the voltage regulator, wherein during a first power mode, the drive terminal of the voltage regulator is coupled to open the first switching device and to close the second switching device to provide regulated voltage from the main voltage supply to a first power plane of a network device and to a second power plane of the network device from the first power plane through the closed second switching device, wherein during a second power mode, the drive terminal of the voltage regulator is coupled to open the second switching device and to close the first switching device to provide auxiliary power to the first power plane.

17. The system of claim 16 wherein the network device comprises a peripheral component interconnect card.

18. The system of claim 16 wherein the first and second switching devices comprise transistors having gate terminals coupled to the drive terminal of the voltage regulator, the apparatus further comprising a low-resistance resistor coupled between the input terminal of the voltage regulator and the gate terminal of the second switching device.

19. The system of claim 16 wherein the first and second switching devices comprise transistors having different conductivity types.

20. The system of claim 16 wherein the first and second switching devices comprise field effect transistors.

21. The system of claim 16, further comprising an auxiliary power supply to provide the auxiliary power.

22. A method, comprising:

providing a single voltage regulator;

during a first power mode, using the voltage regulator to open a first switching device and to close a second switching device to provide regulated voltage to a first power plane and to a second power plane from the first power plane through the closed second switching device; and during a second power mode, using the voltage regulator to open the second switching device and to close the first switching device to provide auxiliary power to the first power plane.

23. The method of claim 22 wherein the first and second switching devices comprise transistors having input terminals coupled to a drive terminal of the voltage regulator, the method further comprising:

connecting a low-resistance resistor between a main power supply and the input terminal of the second switching device; and during the first power mode, driving the input terminal of the second switching device with additional voltage provided from the connection of the resistor with the main power supply.

24. The method of claim 22 wherein the first and second switching devices comprise transistors having different conductivity types.

25. The method of claim 22 wherein the first and second switching devices comprise transistors, wherein closing the first switching device comprises applying a first voltage to an input terminal of the first switching device to turn that transistor on, wherein opening the first switching device comprises applying a second voltage different from the first voltage to the input terminal of the first switching device to turn that transistor off.

26. The method of claim 22 wherein the first and second switching devices comprise field effect transistors.

* * * * *